Jan. 22, 1963    M. M. LEE    3,074,818
INSULATED CONDUCTOR AND METHOD OF PRODUCING SAME
Filed Feb. 3, 1960
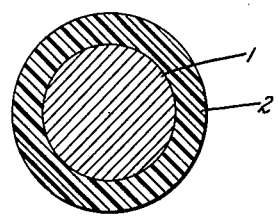
Inventor:
Max Myron Lee,
by Henry J. Marciniak
Attorney.

United States Patent Office
3,074,818
Patented Jan. 22, 1963

3,074,818
INSULATED CONDUCTOR AND METHOD OF PRODUCING SAME
Max Myron Lee, Fort Wayne, Ind., assignor to General Electric Company, a corporation of New York
Filed Feb. 3, 1960, Ser. No. 6,350
7 Claims. (Cl. 117—232)

This invention relates to an improved electrical insulating coating and to a process for producing such coatings. More particularly, it relates to an improved insulating coating and a method for producing such a coating from an aqueous dispersion of terephthalic and isophthalic polyester resins and alkanol amine titanate dialkyl esters. This application is a continuation-in-part of my application Serial No. 790,657, filed on February 2, 1959, now abandoned.

The terephthalic and isophthalic polyester resins which are employed in the practice of this invention are described and claimed in U.S. patent application Serial No. 474,624, filed December 10, 1954, by F. M. Precopio et al. and assigned to the same assignee as the present invention. These polyester resins consist essentially of the product of reaction of terephthalic or isophthalic acid or their dialkyl esters, ethylene glycol and a saturated aliphatic polyhydric alcohol having at least three hydroxyl groups.

One of the significant properties of these synthetic resins that makes them particularly suitable for use as electrical insulating coatings is their outstanding resistance to thermal stresses. It will be appreciated that the thermal stability of the insulating coating on conductors used in a dynamoelectric machine imposes a limitation on its power output. With improved thermal stability of the insulating coatings, it is possible to increase the current density of these conductors and consequently increase the power output of a dynamoelectric machine.

In view of the well-known physical and electrical properties of the terephthalic and isophthalic polyester resins, many attempts have been made in the past to use them as insulating coatings or enamels for magnet wire and other electrical conductors. Generally, in the past cresylic or phenolic types of solvents, such as cresylic acid, have been used in the preparation of a synthetic resin coating for electrical conductors. The solvent does not contribute to the final properties of the coating and in some cases may have a detrimental effect on the cured coating because of color forming non-volatile constituents which often remain in the cured film. The high cost of the solvent used has been a factor which has deterred applications of these synthetic resins. The cost of the solvent is a significant percentage of the total cost of the resin solution since the solvents generally comprise from 60 to 75 percent of the total weight of the resin solution.

Although the need in industry for an insulating coating that could be produced from an aqueous dispersion of terephthalic and isophthalic polyester resins has been well recognized, heretofore insulating coatings have not been successfully produced from aqueous dispersion of the terephthalic and isophthalic polyester resins because of difficulties encountered in connection with the development of suitable catalyst systems compatible with water which would effectively wet the wire conductor and when heat cured would form satisfactory insulating coatings.

Considerable difficulty has been experienced in maintaining the concentricity of the insulating coating produced by prior art methods employing solutions of terephthalic and isophthalic polyester resins. Generally, in industry the coating solution is applied to the wire by passing it through the resin solution, through a suitable die and then a gas fired oven tower maintained at an elevated temperature required to cure the resin coating on the wire. Due to the presence of the solvent in the coating on the wire, the viscosity of the solution decreases rapidly as the wire passes through the oven tower and the temperature of the solution is increased. An extremely fluid film of low viscosity is formed which is subject to the influence of small drafts which are invariably present in a wire tower. These drafts cause the fluid film to be displaced during its travel through the lower portion of the tower, and when the wire reaches the upper or high temperature portion, the coating is cured in an eccentric relationship with respect to the wire. Eccentrically cured coatings have poor dielectric strength and detrimentally affect the space factor when the wire is used in electrical application. This is evidenced by the unevenness of the coating on the wire which may result in thin spots on the film. It is desirable therefore that the coating material applied to the wire increase in viscosity as it is passed through the wire tower so that the coating may more effectively resist the influence of drafts and result in uniformly concentric coatings. Further, it is desirable that the coating medium have such improved coating characteristics that the use of dies in the coating operation can be eliminated.

In commercial coating operations employing resin solutions, it is necessary to recycle the wire a number of times through the resin solution and wire tower in order to obtain the desired build of the coating. The rate at which the film builds up on the wire depends upon the amount of the coating medium that is attracted and held on the surface of the wire as it travels upward from the surface of the coating medium and is a function of the wetting properties of the wire and coating medium, wire size, wire speed, solids content and viscosity of the coating medium. Thus, for a given wire size, wire speed and coating medium, the solids content and viscosity of the coating medium will influence the rate at which the film builds up. It is therefore desirable that the coating medium have a low viscosity at a high solids content to make it possible to increase the thickness of the coating per pass and reduce the number of passes through the system in order to obtain a coating of predetermined thickness.

In the past, it has not been feasible to prepare low viscosity solutions with high solids contents since the viscosity of the solution is appreciably increased as the concentration of the solids in the solution is increased. It will be seen that a higher solids content in the coating medium makes it possible for heavier coatings to be applied in a single pass through the coating medium and the wire tower and thereby reduce the total number of passes required to complete a coating process. It is desirable that a coating medium be developed having a high solids content at relatively low viscosities.

A primary object of the invention is to provide an improved method for coating electrical conductors. It is a further object of the invention to provide an improved insulating coating produced from an aqueous dispersion of terephthalic and isophthalic polyester resins.

Another object of the invention is to provide an improved method of coating a conductor with electrical insulation by passing the wire through the coating medium and a wire tower which does not require the use of dies.

It is still a further object of the invention to provide an aqueous dispersion of terephthalic and isophthalic polyester resins which is readily coatable on metallic conductors and does not undergo an appreciable decrease in viscosity during heat curing in a wire tower.

A more specific object of the invention is to provide an improved method of coating wire with terephthalic and isophthalic polyester resins whereby uniformly concentric coatings can be obtained in a production process in which the wire is passed through the resin coating medium and through a wire tower for the purpose of curing the resin coating.

The foregoing and other objects of this invention may be achieved by coating an electrical conductor with a dispersion of resinous and catalytic solids in water comprising from 25 to 45 percent by weight of said dispersion, said solids comprising (A) particles at least 20 percent of which are less than 1 micron in size, said particles comprising a solidified molten mixture of (1) a polyester resin consisting essentially of the product of the reaction of (a) from about 25 to 56 equivalent percent of a member selected from the class consisting of terephthalic acid, isophthalic acid, lower dialkyl esters of said acids and mixtures thereof, (b) from about 15 to 46 equivalent percent of ethylene glycol and (c) from about 13 to 44 equivalent percent of a saturated aliphatic polyhydric alcohol having at least three hydroxyl groups, the sum of said equivalent percents being equal to 100 equivalent percent and (2) an alkanol amine titanate dialkyl ester, said compound comprising from about 1 to 8 percent by weight of said polyester resin; and (B) a dispersing agent comprising from .25 to 1.5 percent by weight of said solids; and curing said dispersion of solids by heating the coated conductor at a temperature ranging from 300 to 500 degrees centigrade.

Unexpectedly, it was found that by melt blending a terephthalic polyester resin with an alkanol amine titanate dialkyl ester, preferably triethanolamine titanate and di-triethanolamine di-isopropyl titanate, the fine powders of the homogenous solid solution of the resin and curing catalyst obtained after cooling the melt provided a superior catalyst system in an aqueous dispersion. Further, it was found that when an aqueous dispersion of the fine powders was used to coat an electrical conductor, the cured coating not only possessed the characteristic properties of the terephthalic and isophthalic resins but, in addition, exhibited improved properties as compared with electrical conductors coated with solutions of these resins as will hereinafter be more fully discussed.

The single FIGURE of the drawing illustrates an electrical conductor 1 insulated with a coating 2 of the cured aqueous dispersion of the terephthalic polyester resin of the invention. The conductor 1 is characterized by a coating that has a consistently uniform thickness.

The polyester resin which may be used in the practice of the invention is a condensation product of a lower dialkyl ester of a member selected from a class consisting of terephthalic acid and isophthalic acid and mixtures thereof, ethylene glycol and a saturated aliphatic polyhydric alcohol having at least three hydroxyl groups and is more fully described in the aforementioned Precopio et al. application, which is incorporated by reference. Representative isophthalic and terephthalic acid esters which may be used are those dialkyl esters containing alkyl radicals having from 1 to 8, and preferably from 1 to 4 carbon atoms, including dimethyl, diethyl, dipropyl and dibutyl esters. The polyhydric alcohols are those saturated aliphatic polyhydric alcohols having at least three hydroxyl groups, including both polyhydric alcohols in which the hydroxyl groups are connected by a plurality of carbon to carbon linkages, as well as ether alcohols having at least three hydroxyl groups. Examples of such polyhydric alcohols are glycerine, sorbitol, mannitol, diglycerol, and dipentaerythritol.

To form such a polyester resin, the lower dialkyl ester of terephthalic acid and isophthalic acid, the ethylene glycol and the polyhydric alcohol are added to a suitable reaction vessel. Heat is applied to the reaction mixture and the lower alcohol liberated is either vented to the atmosphere or collected in a condenser system. Since the lower dialkyl esters of terephthalic acid have a tendency to sublime when heated too rapidly, a condenser over the reaction vessel is provided for condensing this sublimate while allowing the lower alcohol vapors to escape. The reaction involved is essentially an alcoholysis reaction in which a polyhydric alcohol or a glycol is substituted for the lower alkyl radicals of the lower dialkyl isophthalates or terephthalates with a liberation of the lower alcohol.

The following examples illustrate various compositions of the polyester resins used in the practice of the present invention. The compositions are given in terms of equivalents because the reactants which make up a polyester resin react equivalent for equivalent rather than mole for mole. The term "equivalent percent" as used herein refers to the number of equivalents of a particular reactant divided by the total number of equivalents of all reactants multiplied by 100. The number of moles of a reactant multiplied by the number of functional groups in the reactant, such as carboxyl (—COOH), ester (—COOR) or hydroxyl (—OH), is referred to as the equivalent. Illustrative examples of the resinous compositions expressed in equivalent percent are as follows:

RESIN A

| | |
|---|---|
| Dimethyl terephthalate | 46 |
| Ethylene glycol | 31 |
| Glycerin (95 percent) | 23 |

RESIN B

| | |
|---|---|
| Dimethyl terephthalate | 52 |
| Ethylene glycol | 35 |
| Glycerin (95 percent) | 13 |

RESIN C

| | |
|---|---|
| Dimethyl terephthalate | 45 |
| Ethylene glycol | 22 |
| Glycerin (95 percent) | 33 |

RESIN D

| | |
|---|---|
| Dimethyl terephthalate | 37 |
| Ethylene glycol | 32 |
| Glycerin (95 percent) | 31 |

RESIN E

| | |
|---|---|
| Dimethyl terephthalate | 46 |
| Ethylene glycol | 30 |
| Glycerin (95 percent) | 23 |

RESIN F

| | |
|---|---|
| Dimethyl isophthalate | 23 |
| Dimethyl terephthalate | 23 |
| Ethylene glycol | 31 |
| Glycerin (95 percent) | 23 |

To prepare the polyester resin, the reactants are heated at a temperature from 200 to 270 degrees centigrade to obtain as high a molecular weight material as possible without causing gelation of the reaction product. The reaction is accomplished by heating from 2 to 6 hours. An alcoholysis catalyst, such as lead oxide, lead acetate, zinc oxide, cadmium acetate, titanic acid and other dibasic acid compounds may be added to the reaction mixture at the beginning of the heating period. It is preferred that approximately .1 percent by weight of the metallic component of the catalyst be used based on the total weight of the particular dibasic acid employed.

Although generally this reaction is terminated by pouring a suitable solvent into the hot polyester resin, for the purpose of this invention the polyester resin is allowed to cool down to room temperature without the addition of any solvent. Upon cooling, a brittle solid mass somewhat similar in appearance to rosin is formed. The polyester resins solids thus formed are ready for processing in accordance with the present invention.

In accordance with the invention, the uncured polyester resin solid is melted. Preferably, the temperature should be held below 180 degrees centigrade or below the temperature at which gelation will occur for the particular resin system. The curing catalyst is added to the molten resin and thoroughly blended with the resin.

Curing catalysts which can be used in accordance with the present invention to accelerate the curing reaction of the aqueous dispersion coating are the alkanol amine titanate dialkyl esters having the following structural formula:

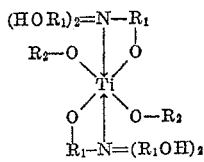

in which $R_1$ and $R_2$ are hydrocarbon radicals containing 2 and 3 carbon atoms respectively. The alkanol amine titanate dialkyl ester is a chelate, the alkanol amine forming secondary bonds between the nitrogen and titanium atoms.

A preferred curing catalyst is ditriethanolamine di-isopropyl titanate and triethanolamine titanate. It will be appreciated that the catalyst system employed in the practice of the present invention must be stable and compatible with water yet must also possess an effective curing rate. Further, it must also be compatible with the molten resin used. Although the effects of many well-known catalysts on the curing action in a resin solution are well-known, the effects of these catalysts in an aqueous dispersion were unpredictable. Although curing catalysts such as zinc octoate, pyromellitic acid and octylene glycol titanate were found to be satisfactory in some respects, they were generally found to be lacking in one or more desirable properties. As an example, zinc octoate was found to be incompatible with the molten resin unless heated to a temperature between 190 and 200 degrees centigrade in order to remove the volatile diluents. Pyromellitic acid was found to be a satisfactory curing catalyst in some respects, but unreacted carboxy groups were found to be present in the cured coating which might be a potential source of trouble. Further, octylene glycol titanate proved to be a very effective curing catalyst insofar as its curing rate was concerned. It was found, however, that the wetting properties of the molten resin in the early stages of the curing treatment were affected to some extent by this catalyst.

In order to obtain significantly improved properties in accordance with the invention, it is necessary that the curing catalyst be melt blended with the polyester resin solids used. As an example, I have found that dissolving the ditriethanolamine di-isopropyl titanate and triethanolamine titanate in the aqueous dispersion of the resin resulted in a very sluggish curing rate and in a cured coating that had unacceptable properties. However, when the curing catalyst was introduced into the molten resin, a significant improvement in curing rate and other properties of the coating were obtained. Satisfactory results may be obtained by employing the curing catalyst in an amount ranging from 1 percent to 8 percent by weight of the resin solids. After the curing catalyst has been blended with the molten resin to form a homogenous solution, it is then cooled to a solid state.

The solid solution of the resin and catalyst are ground to a fine powder having a particle size range in which at least 20 percent or more are less than 1 micron in size.

In the hereinafter described exemplifications of the invention, both wet-grind and dry-grind processes were used to obtain the required particle size. In the wet-grind process the solid solution is first broken into small pieces and then pulverized to a fine powder of approximately —60 mesh. The powder, water and dispersing agent were then charged into a balling mill partially filled with ceramic balls. The temperature of the dispersion in the ball mill should not exceed the temperature of gelation for the resin system. As an example, for the resin A and triethanolamine titanate system, it was found that the temperature of the dispersion in the balling mill had to be maintained below 40 degrees centigrade. When this temperature was exceeded, it was found that satisfactory coatings could not be produced from the dispersion. After wet grinding, the dispersion can be used if sufficient water was added during the milling operation to provide the desired solids content. It will be appreciated that the viscosity of the aqueous dispersion can be readily varied by adjusting its pH.

A dry-grind process was also successfully employed to reduce the particle size of the solid solution of the resin and catalyst. A jet action fluid mill was found to be suitable for this purpose. In such a mill, particle size reduction is achieved by collisions between the particles as they are carried by the air streams at sonic and supersonic velocities. The dry-grind process offers the advantage that the powders can be easily shipped, handled and stored, and the dispersions can be readily prepared by mixing with water at the point of use.

It is preferable, but not necessary, to employ distilled or demineralized water in the preparation of the dispersion. To insure that a complete dispersion is obtained, the mixture may be circulated in a homogenizer or coloid mill for several minutes.

The aqueous dispersion may be employed in a conventional wire coating operation in the same manner as a comparable solution of the resin would be employed. The present invention is particularly adapted to a wire coating operation in which the liquid resin coating is applied to the conductor by passing the conductor through the liquid resin and through an oven or vertical wire tower for the purpose of expelling volatile constituents and curing the resin system. Generally, several passes are required in order to obtain the final build. After the last pass through the wire tower, the wire is cooled and wound on a reel. Due to the improved concentricity of the coating obtainable with the aqueous dispersion of the resin, the use of dies to extrude the viscous resinous liquid over the wire is eliminated.

A dispersing agent is added to the dispersion of the pulverized solid solution of the resin and curing catalyst so that the dispersion will more effectively wet the wire. A preferred dispersing agent is glyceryl mono-oleate. It was found that the glyceryl mono-oleate was extremely effective as both a wetting and dispersing agent when approximately .5 percent by weight of the total resin solids was used, although as little as .05 percent and as much as 1 percent by weight may be satisfactorily used. Polyethylene glycol esters of fatty acids, stearic and its glycerin or ethylene glycol ester may also be used as dispersing agents.

The following examples of the methods of preparing the aqueous dispersions in accordance with the methods of this invention are given by way of illustration, and it is not intended thereby to limit in any way the scope of the invention:

*Example I*

One hundred parts of a resinous solid prepared from the reactants set forth above in the composition for resin A was melted in a stainless steel, round bottom pot, fitted with a heating mantle, a stirrer and a thermometer. It was found that the stirrer should approach the sides and the bottom of the pot as closely as possible since the high viscosity of the solid resin during melting may cause local overheating. The temperature of the resin during melting was held below 180 degrees centigrade in order to prevent gelation. As soon as it was possible, the partially melted resin was slowly stirred.

When all of the resin was melted, the temperature was reduced to approximately 145 degrees centigrade and further heating was discontinued. At this time, 2.5 parts of ditriethanolamine di-isopropyl titanate (80 percent solution of triethanolamine titanate in isopropyl alcohol) was added to the molten resin as it was being mixed. The isopropyl alcohol volatilized as it came in contact with the hot resin. It is preferable to mix the curing catalyst with the molten resin at the lowest possible temperature and the shortest mixing time in order to prevent the possibility of gelation.

When all of the curing agent had been added, mixing was continued for several minutes until a homogenous blend was obtained. The total curing catalyst addition and mixing time was approximately ten minutes. The melt blend was then discharged into shallow pans for rapid cooling. In order to reduce the time at which the blend is subjected to elevated temperatures to a minimum, the resin and curing catalyst blend was cooled as rapidly as possible after it was discharged from the mixing pot. A maximum thickness of approximately two inches was found to be satisfactory. When the molten resin and curing catalyst blend solidified, it was broken into small pieces and passed through a pulverizer for further size reduction of the pieces.

To further reduce the particle size, the following mixture was prepared, all percentages being by weight:

| | |
|---|---|
| Powdered resin and curing agent blend | 35.3 |
| Distilled water | 65.4 |
| Glyceryl mono-oleate | .2 |

The mixture was placed in a porcelain rolling mill jar containing one-third of its volume containing 1 inch and three-quarter inch diameter ceramic balls. The ball milling jar was then rotated at approximately 100 revolutions per minute and allowed to roll for approximately 40 hours.

A portion of the aqueous dispersion was diluted to reduce the solids content to 33 percent and another portion was diluted with water to reduce the solid content to 29 percent. The wire was then coated with each aqueous dispersion by passing the wire through the aqueous dispersion and through a 15 foot wire tower. The wire speed, wire size and the properties of the insulated wire for seven production runs are summarized in Table I.

copper wire at the rate of 26 feet per minute in a 15 foot gas fired tower. Six passes were made. The air temperature of the oven at the bottom was 310 degrees centigrade and the temperature at the top of the oven tower was 425 degrees centigrade. The diameter of the coated wire was 3.1 mils greater than the uncoated wire. Samples of the coated wire were tested and were found to possess the following properties:

| | |
|---|---|
| Scrape abrasion, strokes | 61. |
| Twist dielectric (breakdown volts per mil of coating thickness) | 3500. |
| Eccentricity | 4:5. |
| Solvent resistance (in boiling 50:50 ethyl alcohol and toluene mixture for 10 minutes) | Insoluble. |
| Extractables (in Freon 22, 6 hours at 90 degrees centigrade and 610 pounds per square inch gage, expressed as a percentage of enamel weight | .49 percent. |
| Continuity (breaks per 100 feet, tested at 3000 volts) | 1 to 2. |
| Appearance | Bright-lustrous. |
| Feel | Smooth. |

In order to compare the properties of the cured enameled wire produced by the procedure of this example with a comparable cured enameled wire produced from a resin solution, 25 parts of the condensation product of the reactants of resin A were dissolved in 74 parts of cresylic acid. This solution was then used to coat a .038 inch copper wire at a rate of 24 feet per second in a 15 foot gas fired tower. The air temperature of the tower at the bottom was 270 degrees centigrade and at the top the temperature was 430 degrees centigrade. The wire was passed through the solution and wire six times. Dies

TABLE I

| Run Number | 1 | 2 | 3 | 4 | 5 | 6 | 7 |
|---|---|---|---|---|---|---|---|
| Solids Content (Percent) | 29 | 29 | 29 | 33 | 33 | 29 | 29. |
| pH | 7.0 | 7.0 | 7.0 | 7.0 | 7.0 | 6.6 | 6.6. |
| Wire Size | 0.0100 | 0.0100 | 0.0100 | 0.0100 | 0.0100 | 0.0253 | 0.0253. |
| Film Build (Mils) | 1.0 | 1.2 | 1.6 | 1.6 | 2.4 | 1.6 | 2.3. |
| Number of coats | 6 | 6 | 3 | 6 | 6 | 7 | 7. |
| Tower Temperature, Degrees Centigrade, Top | 375 | 373 | 373 | 375 | 391 | 408 | 418. |
| Tower Temperature, Degrees Centigrade, Bottom | 263 | 275 | 280 | 294 | 306 | 331 | 330. |
| Wire Speed (feet per minute) | 62 | 70 | 70 | 62 | 76 | 26 | 31. |
| Appearance | Very Good | Good | Good | Good | Good | Dark | Good. |
| Feel | V. Smooth | Smooth | Smooth | Smooth | Smooth | Smooth | Smooth. |
| Eccentricity | 1:1 | 1:1 | 1:1 | 1:1 | 1:1 | | 1:1. |
| Solvent Resistance (50:50 toluene and alcohol for 10 minutes) | Passed | Passed | Passed | Passed | Passed | Passed | Passed. |
| Extractables (In Freon 22, 6 hours at 90 degrees Centigrade and 610 pounds per square inch gage, expressed as a percentage of enamel weight. | 0.70 | 0.19 | 0.59 | | | 0.52 | |

*Example II*

One hundred parts of a solid polyester resin prepared by condensing the reactants hereinbefore identified as resin A were heated under an inert atmosphere at a temperature ranging from 140 to 150 degrees centigrade. To this molten resin there was added 3.2 parts of a 60 percent solution of triethanolamine titanate and isopropyl alcohol. The blend of the resin and curing catalyst was cooled rapidly on shallow pans. The solidified blend of the resin and curing catalysts was then ground to a particle size of 40 mesh or finer. One hundred parts of the pulverized blend was then combined with 345 parts of distilled water and 0.5 part of glyceryl mono-oleate. This mixture was then ball milled for a period between 24 to 36 hours. To obtain a pH of 6.5, 0.2 part by weight of pyromellitic acid was added. The dispersion thus formed had a viscosity of 260 centipoises.

This dispersion was used to coat a .038 inch diameter were used. The diameter of the coated wire was 2.9 mils greater than the uncoated wire. The properties of the wire were generally the same except for the following:

| | |
|---|---|
| Eccentricity | 3:1. |
| Extractables (in Freon 22, 6 hours at 90 degrees centigrade and 610 pounds per square inch gage, expressed as a percentage of the enamel weight) | 1.13 percent. |
| Appearance | Slightly colored. |

It was noted that the viscosity of the resin solution decreased rapidly with increasing temperature due to the presence of the solvent which boils approximately at 200 degrees centigrade. During this period of reduced viscosity, the coacting is extremely fluid and influenced by drafts in the wire tower. In contrast, the water in the coating of the aqueous dispersion evaporates below the fusion point of the powder and at a much faster rate leaving a film of finely divided dry solid particles uniformly deposited on the surface of the wire. These particles melt at the fusion temperature of the resin, but the viscosity of the resin without a solvent is much higher than in the presence of a solvent. Thus, the wire coated with the aqueous dispersion has a superior ability to resist the influence of factors which tend to cause the film to accumulate eccentrically around the wire.

In general, it was found that the percent extractables for the resin solution coated wires were twice as large as the percent extractables obtained for the dispersion coated wires. Thus, the aqueous dispersion provides an improved cured coating since it contains significantly less extractables than a comparable coating prepared from a resin solution.

Further, it was noted that the coating produced from the aqueous dispersion had an improved appearance in comparison with the solution coated wire. Since the cresylic acid contains high color forming, nonvolatile impurities, these impurities remain in the cured coating and affect its color.

*Example III*

An aqueous dispersed wire enamel may be prepared in a manner similar to that given in Example I and using the following constituents:

| | Parts |
|---|---|
| Polyester resin (Resin B) | 100 |
| Zinc octoate (containing 8 percent zinc) | 6.25 |
| Glyceryl mono-oleate | 0.5 |
| Water | 285 |

With the above constituents, the aqueous dispersion was found to have a pH of 5.5 and a viscosity of 120 centipoises.

*Example IV*

The following aqueous dispersed wire enamel may be prepared in a manner similar to that given in Example I above and using the following ingredients:

| | Parts |
|---|---|
| Polyester resin (Resin C) | 100 |
| Pyromellitic acid | 2.0 |
| Methyl morpholine | 1.25 |
| Glyceryl mono-oleate | 0.5 |
| Water | 285 |

The aqueous dispersion prepared according to the above formulation had a pH of 6.8 and a viscosity of 200 centipoises.

The solvent resistance of the cured enamel wire was determined by an examination of the physical appearance of the coating after submersion in a refluxing bath of a specified solution. The solution contained a mixture of alcohol and toluene. The alcoholic portion is composed of 100 parts by volume of U.S.P. ethanol and 5 parts by volume of C.P. methanol. The solvent test solution which is referred to herein has the 50:50 solution consisting of equal parts by volume of the alcohol mixture and of toluene. In conducting this test, approximately 250 millimeters of the solution was placed in a 500 millimeter glass which was heated by a suitable electrical heating mantle. A reflux condenser was attached to the glass and the solution maintained at reflux temperature. The sample wire is formed so three or more straight lengths of the wire having ends cut can be inserted through the condenser into the boiling solvent. After 10 minutes, the wire is removed and examined for blisters, distortion, softness and other defects. Any visible change in the surface of the coating constitutes a failure. The solvent resistance of coated conductors in accordance with the invention was found to be in all instances equal or better than the solvent resistance of the cured coatings prepared from a solution of the resin.

To determine the concentricity a cross section of the wire was examined under a microscope at a magnification of 15 and 75. The minimum thickness of the coating and the maximum thickness were estimated and the test results were expressed in the form of a ratio of thicknesses. An outstanding property of the cured coatings prepared from the aqueous dispersions of the resins was the consistent uniformity in thickness of the coatings. Further, it was found that this improved uniformity of coating was obtained regardless of the shape of the wire. Thus, because of the significantly improved uniform coatings obtainable from the aqueous dispersion, according to the invention, it has become possible to eliminate the need for dies in a commercial coating operation.

In the method of the present invention, the film build depends on the amount of dispersion that is attracted and held on the surface of the wire as it travels upward from the surface of the dispersion. Therefore, the film build depends on a number of factors such as the wetting properties of the wire and the dispersion, wire size, wire speed, solid content and viscosity. As the size of the wire is decreased, the coating procedure can be readily adjusted to obtain the required film build by lowering the solid content of the dispersion, reducing its viscosity, reducing the wire speed or employing higher wire tower temperatures. In view of the fact that a production operation requires maximum coating speed, the solids content may be readily varied. It is to be understood that the viscosity can be also easily varied by changing the pH by the addition of suitable neutralizing agents. Thus, in accordance with the invention it is possible to use a standard dispersion for most wire sizes. It was found by controlling the pH between 6.0 and 7.0 any desired viscosity between 200 and 300 centipoises can be obtained with an aqueous dispersion containing a 29 percent solids content.

In addition, it was found that the coating speed can be increased by increasing the amount of curing catalyst melt blended with the resin. As an example, a dispersion containing a curing catalyst in the amount of 6 percent by weight of the resin solids, all other factors being equal, made it possible to increase the coating speed by 15 percent as compared with the coating speed required for a dispersion containing 2 percent by weight of the curing agent. In other words, with a 4 percent increase in the amount of the curing catalyst added to the solids content, a 15 percent increase in productive output was realized.

As shown in Table I, a number of wires coated from water disposed dispersions of resin A were tested for extractables. In general, the test for extractables was conducted by exposing wire samples for 6 hours at a temperature of 90 degrees centigrade and a pressure of 610 pounds per square inch gage. The samples were weighed before and after the test. The significant reduction in extractables is due to the fact that there are no high boiling residues introduced into the cured coating by the water used to carry the resin.

While the present invention has been described with reference to specific illustrative examples, it will be understood that numerous modifications may be made by one skilled in the art which are within the scope of this invention. It is to be understood, therefore, that I intend by the appended claims to cover all such modifications as fall within the true spirit and scope of the invention.

What I claim as new and desire to secure by Letters Patent of the United States is:

1. A process for applying a substantially uniform insulating coating on a conductor comprising coating said conductor with a dispersion in water of resinous and catalytic solids, said solids comprising (1) from 25 to 45 percent by weight of said dispersion and comprising particles at least 20 percent of which are less than 1 micron in size, said particles comprising a solidified molten blend of (A) a polyester resin consisting essentially of the product of the reaction of (a) from about 25 to 56 equivalent percent of a member selected from the class consisting of terephthalic acid, isophthalic acid, lower dialkyl esters of said acids and mixtures thereof, (b) from about 15 to 46 equivalent percent of ethylene glycol and (c) from about 13 to 44 equivalent percent of a saturated aliphatic polyhydric alcohol having at least three hydroxyl groups, the sum of said equivalent percents being equal to 100 equivalent percent, and (B) an alkanol amine titanate dialkyl ester comprising from about 1 to 8 percent by weight of said polyester resin; and (2) a dispersing agent comprising from .25 to 1.5 percent by weight of said solids; and heating said dispersion to evaporate said water and cure said polyester resin.

2. The process set forth in claim 1 in which said alkanol amine titanate dialkyl ester is ditriethanolamine di-isopropyl titanate.

3. The process set forth in claim 1 in which the dispersing agent is glyceryl mono-oleate.

4. An electrical conductor coated with a cured composition comprising the heat reaction product of resinous and catalytic solids in an aqueous dispersion, said solids comprising from 25 to 45 percent by weight of said dispersion and comprising particles at least 20 percent of which are less than 1 micron in size, said particles comprising a solidified molten blend of (1) a polyester resin consisting essentially of the product of the reaction of (a) from about 25 to 56 equivalent percent of a member selected from the class consisting of terephthalic acid, isophthalic acid, lower dialkyl esters of said acids and mixtures thereof, (b) from about 15 to 46 equivalent percent of ethylene glycol, and (c) from about 13 to 44 equivalent percent of a saturated aliphatic polyhydric alcohol having at least three hydroxyl groups, the sum of said equivalent percents being equal to 100 equivalent percent and (2) an alkanol amine titanate dialkyl ester comprising from about 1 to 8 percent by weight of said polyester resin.

5. The electrical conductor as set forth in claim 4 in which said alkanol amine titanate dialkyl ester is ditriethanolamine di-isopropyl titanate.

6. An electrical conductor coated with a composition comprised of the heat reaction product of resinous and catalytic solids in an aqueous dispersion, said solids comprising (1) from 25 to 45 percent by weight of said dispersion and comprising particles at least 20 percent of which are less than 1 micron in size, said particles comprising a solidified molten blend of (A) a polyester resin consisting essentially of the product of the reaction of (a) from about 25 to 56 equivalent percent of a member selected from the class consisting of terephthalic acid, isophthalic acid, lower dialkyl esters of said acids and mixtures thereof, (b) from about 15 to 46 equivalent percent of ethylene glycol, and (c) from about 13 to 44 equivalent percent of a saturated aliphatic polyhydric alcohol having at least three hydroxyl groups, the sum of said equivalent percents being equal to 100 equivalent percent and (B) an alkanol amine titanate dialkyl ester comprising from about 1 to 8 percent by weight of said polyester resin; and (2) glyceryl mono-oleate comprising from .25 to 1.5 percent by weight of said solids.

7. An electrical conductor coated with a cured composition comprising the heat reaction product of resinous and catalytic solids in an aqueous dispersion, said solids comprising (1) from 25 to 45 percent by weight of said dispersion and comprising particles at least 20 percent of which are less than 1 micron in size, said particles comprising a solidified molten blend of (A) a polyester resin consisting essentially of the product of the reaction of (a) from about 25 to 56 equivalent percent of a member selected from the class consisting of terephthalic acid, isophthalic acid, lower dialkyl esters of said acids and mixtures thereof, (b) from about 15 to 46 equivalent percent of ethylene glycol, and (c) from about 13 to 44 equivalent percent of a saturated aliphatic polyhydric alcohol having at least three hydroxyl groups, the sum of said equivalent percents being equal to 100 equivalent percent and (B) triethanolamine diisopropyl titanate comprising from about 1 to 8 percent by weight of said polyester resin; and (2) glyceryl mono-oleate comprising from .25 to 1.5 percent by weight of said solids.

References Cited in the file of this patent

UNITED STATES PATENTS

| | | |
|---|---|---|
| 2,272,057 | Cheetham | Feb. 3, 1942 |
| 2,581,454 | Sprung | Jan. 8, 1952 |
| 2,727,881 | Caldwell et al. | Dec. 20, 1955 |
| 2,809,184 | Langer | Oct. 8, 1957 |
| 2,917,414 | McLean | Dec. 15, 1959 |

FOREIGN PATENTS

| | | |
|---|---|---|
| 775,081 | Great Britain | May 22, 1957 |
| 558,581 | Canada | June 10, 1958 |